United States Patent
Yu et al.

(10) Patent No.: US 9,683,693 B2
(45) Date of Patent: Jun. 20, 2017

(54) SELF-OPENING SUPPORTING DEVICE

(71) Applicant: SYNCMOLD ENTERPRISE CORP., New Taipei (TW)

(72) Inventors: Shin-Hong Yu, New Taipei (TW); Ying-Yen Huang, New Taipei (TW); Juei-Hsien Wang, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 15/003,219

(22) Filed: Jan. 21, 2016

(65) Prior Publication Data

US 2017/0027069 A1    Jan. 26, 2017

(30) Foreign Application Priority Data

Jul. 21, 2015  (TW) .............................. 104211680 U (51) Int. Cl.
 *G06F 1/16* (2006.01)
 *F16M 13/00* (2006.01)
 *F16B 1/00* (2006.01)

(52) U.S. Cl.
 CPC ......... *F16M 13/005* (2013.01); *G06F 1/1601* (2013.01); *G06F 1/166* (2013.01); *G06F 1/1626* (2013.01); *F16B 2001/0035* (2013.01); *G06F 2200/1612* (2013.01)

(58) Field of Classification Search
 CPC .. H05K 5/0234; H05K 5/0204; F16M 13/005; F16M 13/022; F16B 2001/0035; G06F 1/166; G06F 1/1626; G06F 1/1601
 USPC ............ 248/688, 155.2; 361/679.59, 679.01; 40/753, 748, 754; 348/794
 See application file for complete search history.

(56) References Cited

U.S. PATENT DOCUMENTS

| | | | | |
|---|---|---|---|---|
| 6,018,847 A * | 2/2000 | Lu | .......................... | F16M 11/10 16/307 |
| 6,570,627 B1 * | 5/2003 | Chang | .................... | F16M 11/10 248/917 |
| 6,975,507 B2 * | 12/2005 | Wang | .................... | G06F 1/1616 16/333 |
| 7,299,580 B2 * | 11/2007 | Wang | .................... | F16M 11/10 248/461 |
| 7,301,759 B2 * | 11/2007 | Hsiung | ................ | H05K 5/0234 248/188 |
| 7,467,773 B2 * | 12/2008 | Ogawa | ..................... | H04N 5/64 248/454 |
| 7,636,133 B1 * | 12/2009 | Hsu | ........................ | F16M 11/10 248/917 |

(Continued)

FOREIGN PATENT DOCUMENTS

TW    M292713    *    6/2006

*Primary Examiner* — Muhammad Ijaz
(74) *Attorney, Agent, or Firm* — Muncy, Geissler, Olds & Lowe, P.C.

(57) ABSTRACT

A self-opening supporting device for a display is provided. The self-opening supporting device comprises a securing element, a first moving element, a stand and an elastic element. The securing element is formed with a first slide extending along an inclined direction. When an external force is applied to the first moving element, the first moving element uses a first sliding block to slide along the first slide so as to drive the stand to swing out from the display. When the stand is swung out exceeding an angle, the elastic element is actuated.

10 Claims, 5 Drawing Sheets

(56) References Cited

U.S. PATENT DOCUMENTS

| | | | | |
|---|---|---|---|---|
| 7,735,797 B2* | 6/2010 | Hu | ............... | F16M 11/10 16/340 |
| 7,753,336 B2* | 7/2010 | Hu | ............... | A47B 97/04 248/188.8 |
| 7,762,518 B2* | 7/2010 | Ogawa | ............... | H04N 5/64 248/176.3 |
| 7,866,615 B2* | 1/2011 | Hsuan | ............... | F16M 11/041 248/188.8 |
| 7,975,970 B2* | 7/2011 | Hu | ............... | F16M 11/10 248/136 |
| 8,382,059 B2* | 2/2013 | Le Gette | ............... | F16M 11/04 248/163.1 |
| 8,498,101 B2 | 7/2013 | Chiang et al. | | |
| 8,540,205 B2* | 9/2013 | Zhang | ............... | F16M 11/10 248/686 |
| 8,837,130 B2* | 9/2014 | Hyun | ............... | F16M 11/04 16/308 |
| 9,086,842 B2* | 7/2015 | Wen | ............... | G06F 1/166 |
| 9,223,347 B2* | 12/2015 | Hsu | ............... | G06F 1/1637 |
| 2003/0025063 A1* | 2/2003 | Chen | ............... | F16M 11/16 248/652 |
| 2004/0084588 A1* | 5/2004 | Liu | ............... | G06F 1/1601 248/291.1 |
| 2005/0001114 A1* | 1/2005 | Ogawa | ............... | F16M 11/10 248/127 |
| 2010/0050383 A1* | 3/2010 | Wang | ............... | F16M 11/10 16/297 |
| 2010/0051761 A1* | 3/2010 | Wang | ............... | F16M 13/00 248/125.1 |
| 2011/0247252 A1* | 10/2011 | Chen | ............... | F16M 11/10 40/745 |
| 2012/0236475 A1* | 9/2012 | Peng | ............... | F16M 11/105 361/679.01 |
| 2013/0077211 A1* | 3/2013 | Wang | ............... | G06F 1/1637 361/679.01 |
| 2013/0242472 A1* | 9/2013 | Guo | ............... | F16M 11/10 361/679.01 |
| 2014/0085783 A1* | 3/2014 | Li | ............... | F16M 11/10 361/679.01 |
| 2014/0175253 A1* | 6/2014 | Huang | ............... | F16M 11/105 248/558 |
| 2015/0102196 A1* | 4/2015 | You | ............... | H05K 5/0204 248/354.5 |
| 2015/0160694 A1* | 6/2015 | Truong | ............... | G06F 1/166 348/838 |
| 2015/0257299 A1* | 9/2015 | Su | ............... | A47B 97/00 361/679.01 |
| 2016/0230924 A1* | 8/2016 | Chen | ............... | F16M 13/005 |
| 2016/0249472 A1* | 8/2016 | Tu | ............... | A45C 11/00 |
| 2016/0295716 A1* | 10/2016 | Chen | ............... | F16M 13/005 |

* cited by examiner

SELF-OPENING SUPPORTING DEVICE

CROSS REFERENCE TO RELATED APPLICATION

This application claims the benefits of the Taiwan Patent Application Serial Number 104211680, filed on Jul. 21, 2015, the subject matter of which is incorporated herein by reference.

BACKGROUND OF THE INVENTION

1. Field of the Invention

The present invention relates to a self-opening supporting device, more particularly, to a self-opening supporting device for a frame-panel display device.

2. Description of Related Art

An expandable support frame for a display device is disclosed by U.S. Pat. No. 8,498,101, wherein a spring is disposed at a pivot axle between the support frame and the display device for connecting therebetween and provides an elastic force. The angle between the support frame and the frame-panel display device may be adjusted by the users through overcoming the elastic force of the spring, thus, the frame-panel display device can be used in a desirable operation status.

The frame-panel display device having the support frame and the pivot spring is known in the art, however, the adjustment of the angle between the support frame and the frame-panel display device should be operated with both hands. It is very difficult to be operated with one hand.

Therefore, it has potential in the art for developing an improved supporting device to obviate the aforementioned problems.

SUMMARY OF THE INVENTION

The object of the present invention is to provide a self-opening supporting device for a display device. When the display device is placed on the working surface, the reaction force generated by the contact of the self-opening supporting device and the working surface automatically drive the stand to swing out to a predetermined angle. The users may further apply a force to overcome the torsional force of the elastic element; therefore, the stand may swing out to a larger angle. When the external force is unloaded, the stand may return to its original position due to the restoring force of the elastic element or its own weight.

Comparing to the prior art, in which the stand of the supporting device needs to be operated by hands, the present invention provides a self-opening supporting device of which the stand is capable of automatically switching between upright or back-tilting positions. Accordingly, the self-opening supporting device of the present invention is easy to operate even with one hand.

Another object of the present invention is to provide a self-opening supporting device for a display device. Comparing to the supporting device of the prior art, which requires a plurality of torsion springs or tension springs for the erected stand to maintain at a particular angle, the components of the self-opening supporting device of the present invention are less complicated and the cost of manufacture is relatively lower.

To achieve the above mentioned object, the present invention disclosed a self-opening supporting device for a display having a housing that extends on a first direction, the self-opening supporting device comprises: a securing element, a first moving element, a stand, and an elastic element; wherein the securing element is fastened to the housing of the display, and the securing element is formed with a first slide which extends along an inclined direction with respect to the first direction; the first moving element has a first sliding block and is slidably disposed at the first slide; the stand is pivotally secured to the securing element; and the elastic element is disposed between the stand and the securing element.

When an external force is applied to the first moving element along the first direction, the first moving element utilizes the first sliding block to slide along the first slide and drives the stand to swing out from the housing of the display; and when the stand swings out to an angle exceeding a predetermined angle, the elastic element is actuated. The stand is pivotally secured to the securing element by a pivot axle, and the elastic element is a torsion spring sleeved to the pivot axle and has a free end. Accordingly, the stand is actuated when the stand swings out to an angle exceeding the predetermined angle and the free end of the torsion spring abuts against the stand.

In one embodiment of the present invention, the first moving element has a convex portion being formed with a first abutting surface and a second abutting surface which are adjacent to each other. When the external force is applied to the first moving element, the first abutting surface drives the stand to swing out to a first angle with respect to the first direction, and the second abutting surface subsequently drives the stand to swing out to a second angle with respect to the first direction, wherein the second angle is larger than the first angle.

Furthermore, the first slide comprises two first slots which are parallel to each other, and the first sliding block comprises two first sliding shafts which are respectively disposed through the first slots In another embodiment, the securing element is further formed with a second slide which substantially extends along the first direction and comprises two second slot. The self-opening supporting structure further comprises a second moving element which has a second sliding block and comprises two second sliding shaft, wherein the second sliding block is slidably disposed through the second slide. When the second sliding block slides in the second slide, the second moving element moves along the first direction and contacts the first moving element and transfers the external force to the first moving element.

When the external force is unloaded, the stand is retrieved to the predetermined angle by the elastic element, and subsequently toward the housing by its own weight. Preferably, the self-opening supporting device of the present invention further comprises a magnetic element being disposed on the second moving element, and an attaching element being disposed on the stand corresponding to the magnetic element to magnetically attract with each other. Accordingly, the magnetic element and the attaching element magnetically contact with each other and the stand substantially attaches to the housing when the external force is unloaded.

The objects, technical features, and advantages mentioned above will become more apparent from the following detailed description when taken in conjunction with the accompanying drawings.

DETAILED DESCRIPTION OF THE PREFERRED EMBODIMENT

Figure 1:
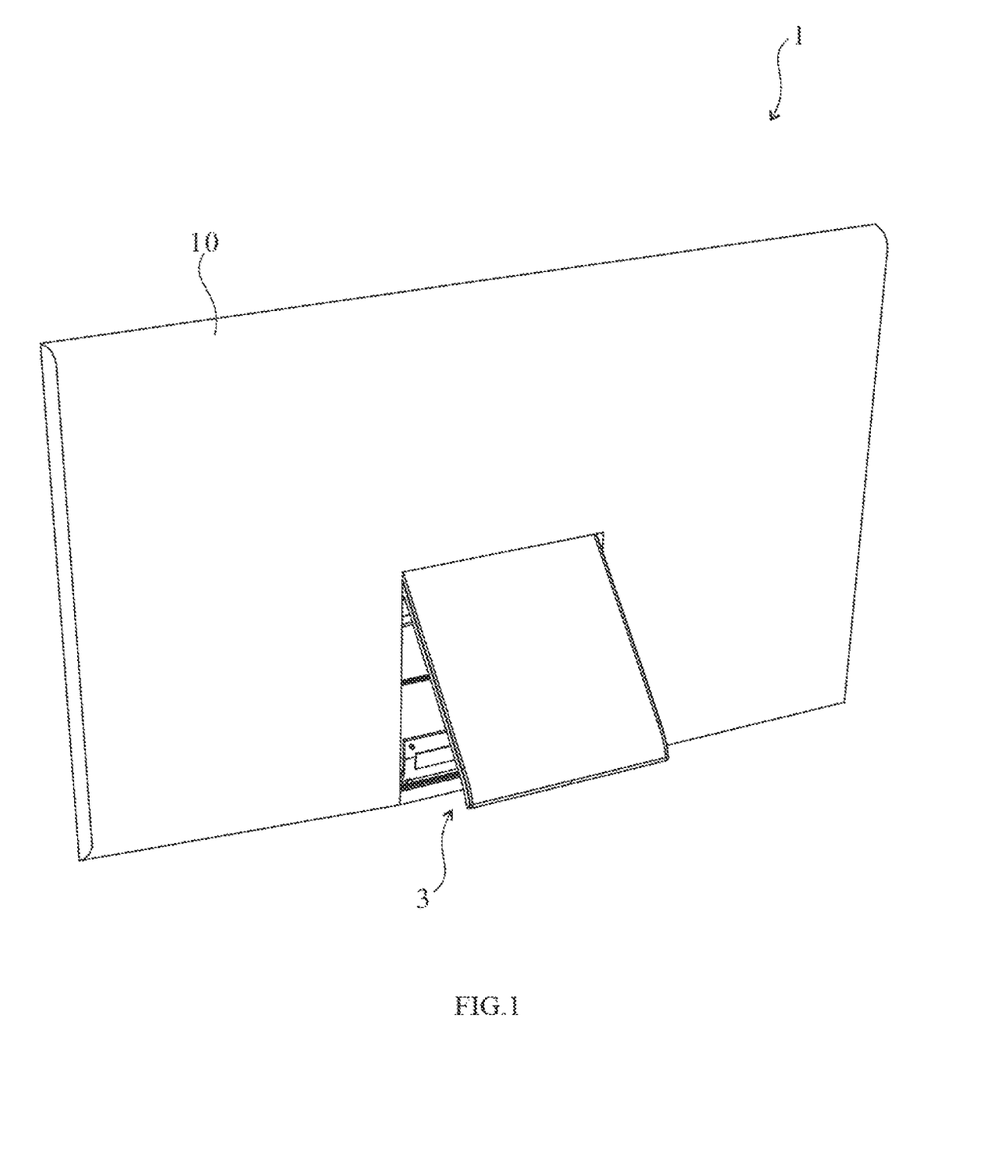
FIG. 1 is a perspective view showing the self-opening supporting device of the present invention operated on a display.
Figure 2:
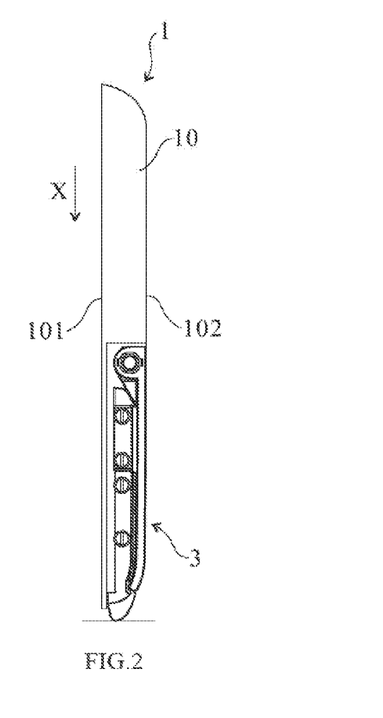
FIG. 2 to FIG. 4 are side views of the stand erecting with respect to the display.
Figure 3:
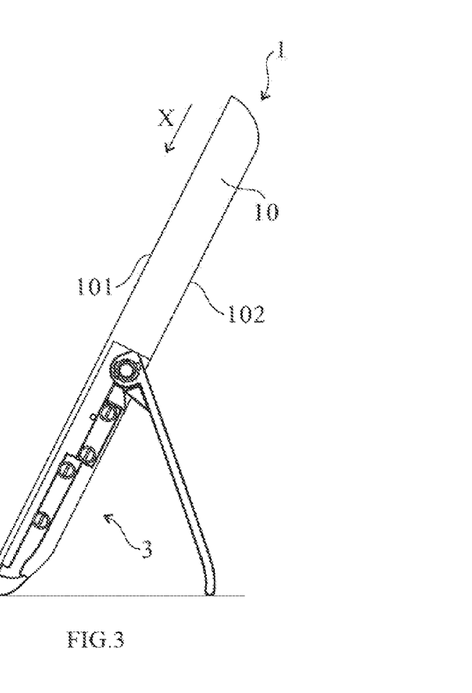
Figure 4:
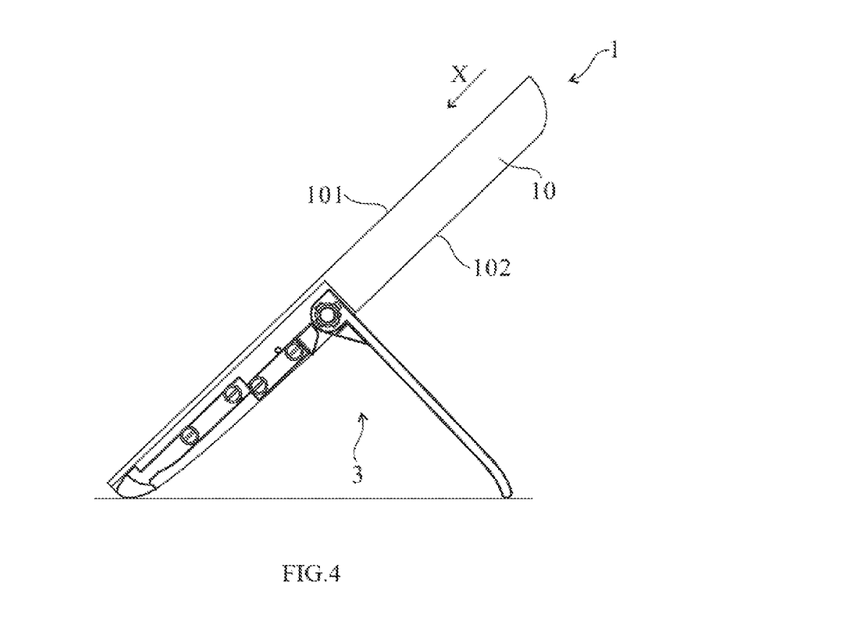

Please refer to FIG. 1 to FIG. 4, FIG. 1 shows a rear perspective view of a display 1. The self-opening supporting device 3 of the present invention is applied to the display 1, and is preferable to be disposed on the lower back of the display 1. In other words, a frame-panel display device is formed with the self-opening supporting device 3 and the display 1. FIG. 2 to FIG. 4 are the lateral perspective views of the display 1 and the self-opening supporting device 3, which show the transformation process of the self-opening supporting device 3 of the present invention from a collapsed condition to an erect condition. The lower edge of the display 1 and the self-opening supporting device 3 simultaneously abut against a horizontal working surface (such as a desktop) to firmly maintain a suitable viewing angle for the display 1 when the self-opening supporting device 3 is in the erect condition. For the purpose of clearly describing the self-opening supporting device 3, the display 1 may be defined to have a housing 10 extending in a first direction X, wherein the first direction X is perpendicular to the working surface when the self-opening supporting device contact to the working surface at the beginning as shown in FIG. 2, however, the present invention is not limited thereto.

Figure 5:
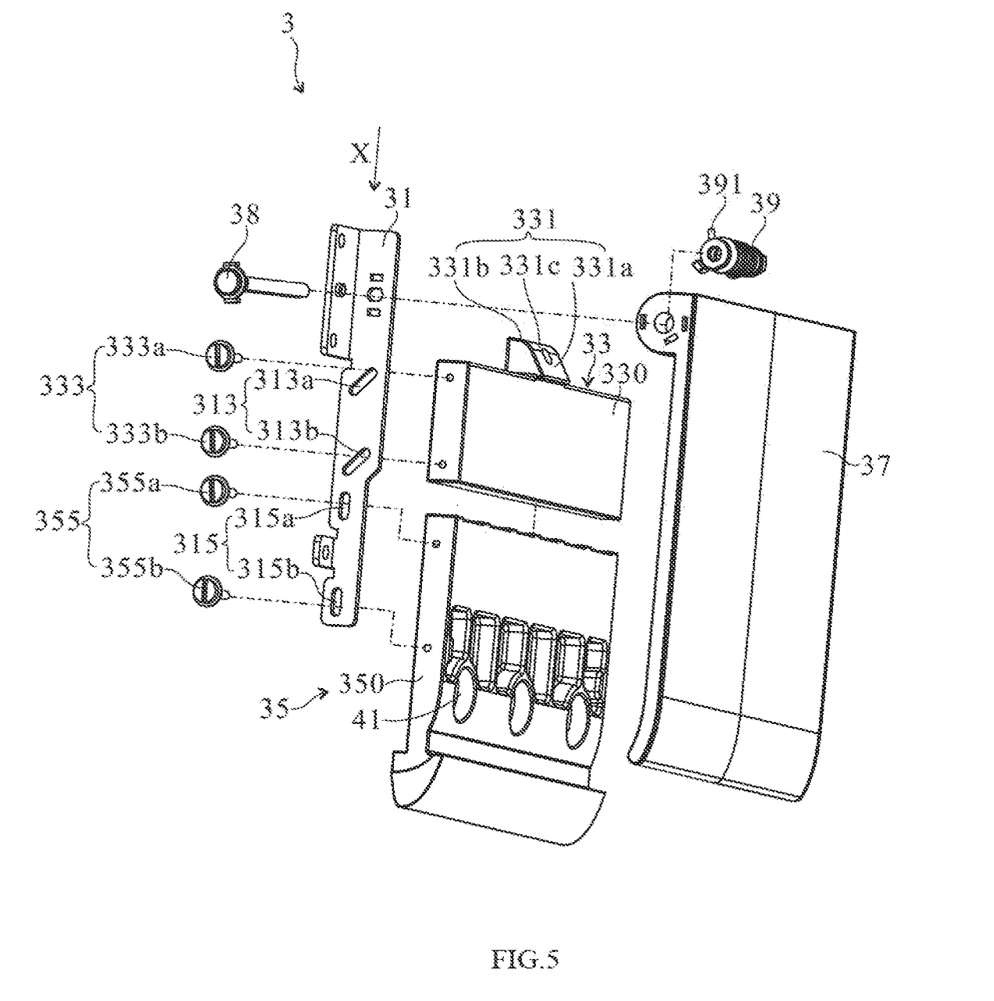
FIG. 5 is an explosion view of the self-opening supporting device of the present invention.

FIG. 5 shows an explosion view of the self-opening supporting device 3 of a preferred embodiment of the present invention. The detail of the self-opening supporting device 3 of the present invention may be clearly disclosed from the following detailed description with reference to FIG. 5.

The self-opening supporting device 3 of the present invention comprises a securing element 31, a first moving element 33, a second moving element 35, a stand 37, and an elastic element 39. As illustrated in FIG. 2 to FIG. 4, the securing element 31 is fastened to the housing 10 of the display 1. The housing 10 of the display 1 has a front surface 101 and a back surface 102 opposing to the front surface 101, wherein the securing element 31 is fastened to the back surface 102 and extends along the first direction X, and the securing element 31 is formed with a first slide 313 that laterally extends in an inclined direction with respect to the first direction X. More specifically, the first slide 313 extends in an inclined direction that faces towards the front surface 101 of the housing 10 and simultaneously departs from the elastic element 39, as illustrated in FIG. 5, the first slide 313 extends in an inside-out and top-down inclined direction. In the present embodiment, the first slide 313 comprises two first slots 313a, 313b which are parallel to each other, but the amount thereof is not limited thereto. Furthermore, the front surface 101 of the housing 10 indicates the viewing side for viewing the display 1, but the present invention is not limited thereto.

The first moving element 33 has a main body 330 and a first sliding block 333 connected to the main body 330, wherein the first sliding block 333 is slidably disposed at the first slide 313. Specifically, the first sliding block 333 comprises two first sliding shafts 333a, 333b which are two rivets in the present embodiment. The two rivets are respectively disposed through the first slots 313a, 313b, connected to the main body 330, and may slide in the first slots 313a, 313b.

Further, the first moving element 33 has a convex portion 331 extending from the main body 330. The convex portion 331 is formed with a first abutting surface 331a, a second abutting surface 331b, and an arc surface 331c that connects to the first abutting surface 331a and the second abutting surface 331b therebetween, so that the first abutting surface 331a and the second abutting surface 331b are adjacent to each other through the arc surface 331c. The functions thereof will be described in the following paragraphs.

In the present embodiment, the securing element 31 is further formed with a second slide 315 that substantially extends along the first direction X. The second slide 315 comprises two second slots 315a, 315b, and the second moving element 35 has a main body 350 and a second sliding block 355 connected to the main body 350. The second sliding block 355 comprises two second shafts 335a, 335b which are two rivets in the present embodiment. The two rivets are respectively disposed through the second slots 315a, 315b, connected to the main body 350, and may slide in the second slots 315a, 315b. It should be understood that the second sliding block 35 moves in the first direction X when the second sliding block 355 slides at the second slide 315.

Due to the configuration of the inclined first slots 313a, 313b and the second slots 315a, 315b that extend in the first direction X, the second moving element 35 moves along the first direction X when a force is applied thereto. Subsequently, the second moving element 35 contacts the first moving element 33 and transfers an external force to the first moving element 33. The first sliding block 333 slides along the first slide 313 and moves in an inclined direction with respect to the first direction when the external force is applied to the first moving element 33.

The stand 37 is pivotally secured to the securing element 31, wherein the stand 37 is pivotally secured to the securing element 31 by a pivot axle 38 as shown in the illustration. The elastic element 39 is sleeved to the pivot axle 38 and is disposed between the stand 37 and the securing element 31. Preferably, the elastic element 39 is a torsion spring. The elastic element 39 is actuated when the stand 37 swings out exceeding a predetermined angle. In other words, in the process of expanding the stand 37 from its original state to the predetermined angle in the present invention, the elastic element 39 is not actuated until the stand 37 swings out exceeding a predetermined angle. In fact, when the stand 37 swings out exceeding the predetermined angle, a free end 391 of the torsion spring may abut against the stand 37, and the torsion spring is driven to be twisted and actuated. The detail of the actuation of the elastic element 39 will be described in the following paragraphs.

Figure 6:
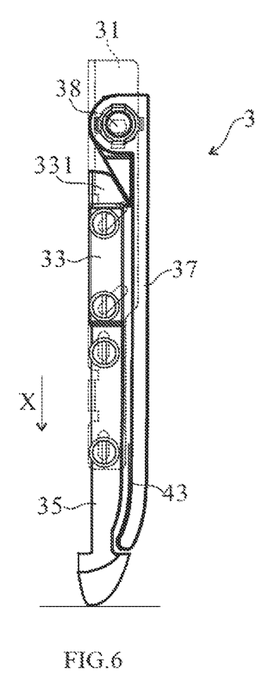
FIG. 6 to FIG. 8 are side views of the erected stand driven by the first moving element.
Figure 7:
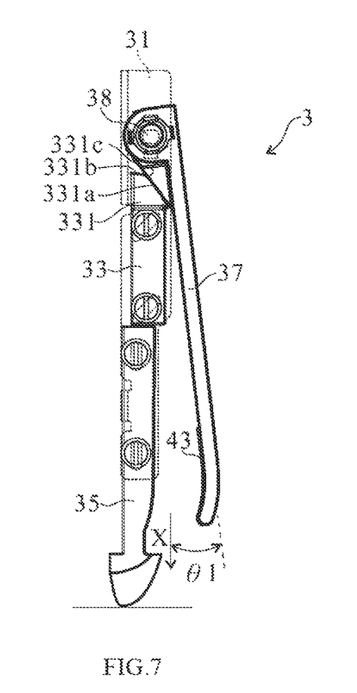
Figure 8:
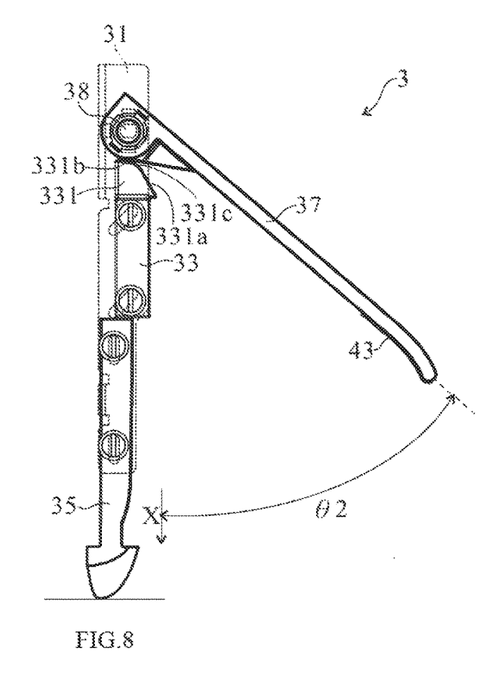

Please refer to FIG. 6 to FIG. 8, which illustrate the expanding process of the stand 37 driven by the first moving element 33. The securing element 31 is fastened to the display 1, while the first moving element 33, the second element 35, and the stand 37 move or rotate with respect to the securing element 31. For clear presentation of the actuating process in FIG. 6 to FIG. 8, the securing element 31 is shown in dashed line for convenience of identification and description. A force is applied to the second moving element 35, and the second moving element 35 utilizes the second sliding block 355 to slide along the second slide 315

(that is, two sliding shafts 355a, 355b move from the bottom to the top of the second slots 315a, 315b) when the second moving element 35 contacts to the horizontal working surface. Therefore, the second moving element 35 moves opposing the first direction X and immediately transfer the force to the first moving element 33 along the direction opposite to the first direction X. Then, the first moving element 33 utilizes the first sliding block 333 to slide along the first slide 313 (that is, two first sliding shafts 333a, 333b move from the left-bottom to the right-top of the first slots 313a, 313b) when the force is applied to the first moving element 33. At the meantime, the first moving element 33 moves diagonally with respect to the direct opposite to the first direction X to drive the stand 37 to swing out from the housing 10 of the display 1.

More specifically, as shown in FIG. 7 and FIG. 8, when a force is applied to the first moving element 33, the first abutting surface 331a drives the stand 37 to swing out an angle no greater than a first angle $\theta 1$ with respect to the first direction X. If the first moving element 33 continues to move along the first slide 313, the arc surface 331c subsequently contacts the stand 37, then immediately converted to the second abutting surface 331b for contacting the stand 37, and the second abutting surface 331b drives the stand 37 to swing out to a second angle $\theta 2$ with respect to the first direction X. Accordingly, the stand 37 is sequentially driven by the first abutting surface 331a, the arc surface 331c, and the second abutting surface 331b, and thus the stand 37 is smoothly expanded. The second angle $\theta 2$ is greater than the first angle $\theta 1$, and the above mentioned predetermined angle is the second angle $\theta 2$. Therefore, the free end 391 of the elastic element 39 abuts against the stand 37 and is driven to be twisted and actuated when the stand 37 swings out exceeding the second angle $\theta 2$.

In the present embodiment, the stand 37 is driven by the first abutting surface 331a to swing out to the first angle $\theta 1$, and the stand 37 is subsequently driven by the second abutting surface 331b to swing out to the second angle $\theta 2$. The purpose thereof is ensuring the expanded angle of the stand 37 to be large enough to comply with the relevant safety regulations and for being user-friendly with one-hand operation. If the stand 37 is driven only by the second abutting surface 331b to swing out to the second angle $\theta 2$ straightly from the collapsed condition, the stand 37 would be difficult to expand due to the weak driving force at the beginning. Even if the driving force is strong enough for driving the stand 37, the expanding process thereof would be too fast and unsmooth. Accordingly, in the present embodiment, the first abutting surface 331a and the second abutting surface 331b are designed to sequentially abut against and drive the stand 37 to swing out to the first angle $\theta 1$ at first, then swing out to the second angle $\theta 2$ for smooth operation.

Figure 9:
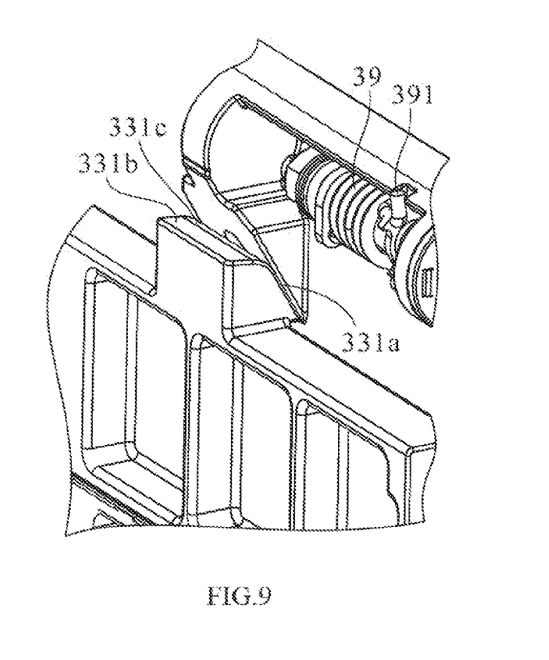
FIG. 9 is a schematic view showing the non-actuated elastic element.
Figure 10:
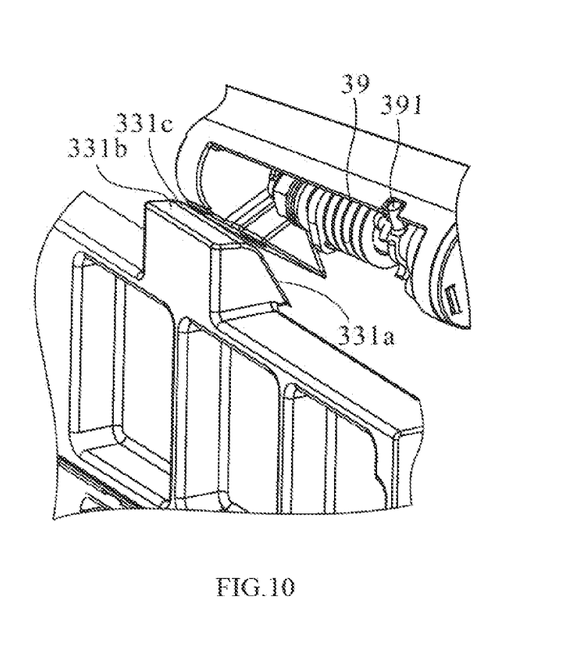
FIG. 10 is a schematic view showing the actuated elastic element.

In the expanding process of the stand 37 illustrated in FIG. 6 to FIG. 8, the elastic element 39 is actually unactuated. In the process shown in FIG. 9, the free end 391 of the elastic element 39 is not abutted to any element; therefore, the elastic element 39 is not actuated and fails to provide any torsional force. As illustrated in FIG. 10, the free end 391 of the elastic element 39 abuts against the corresponding notch of the stand 37 and is twisted and actuated to continuously provide a torsional force when the stand 37 swings out exceeding a predetermined angle (such as the second angle $\theta 2$).

In other words, the expanding process of the stand 37 as the display 1 being placed perpendicularly onto the horizontal working surface is illustrated in FIG. 6 to FIG. 8, wherein the stand 37 is expanded at the second angle $\theta 2$ after the expanding process. Please refer to FIG. 3 and FIG. 4, the display 1 may be slightly tilted by the users so that the bottom edge of the display 1 and the stand 37 may abut against the horizontal working surface to maintain the balance of the display 1 for operation. The stand 37 may further be expanded as needed; the elastic element 39 is actuated when the stand 37 swing out to an angle exceeding the second angle $\theta 2$, and the balance of the display 1 may still be maintained due to the weight of the display 1, the torsional force provided by the elastic element 39, and the interactions of each component of the self-opening supporting device 3. Therefore, the tilt angle of the display 1 may be adjusted. More specifically, as the expanded angle of the stand becomes larger, the vertical component of force of the weight of the display 1 becomes greater, and the torsional force provided by the elastic element 39 also becomes greater in order to maintain the balance of the whole structure, therefore, the display 1 may be tilted and stay at any angle on the horizontal working surface.

The retrieving process of the stand 37 is described in the present paragraph. When the external force is unloaded, such as lifting the display 1 illustrated in FIG. 4, the self-opening supporting device 3 of the present invention is no longer affected by the weight of the display 1. As a result, the stand 37 returns to the predetermined angle (such as the second angle $\theta 2$) as shown in FIG. 8 by the restoring force of the elastic element 39, and the stand 37, the first moving element 33, and the second moving element 35 is unsupported and moves downward as illustrated sequentially in FIG. 8, FIG. 7 and FIG. 6. Accordingly, the second moving element 35 slides from up to down along the second slide 315 by the second sliding block 355 due to the gravity; the first moving element 33 slides from the upper right to the lower left along the first slide 313 by the first sliding block 333; and the stand 37 swings toward the securing element 31 and retrieves to its collapsed condition, that is, returns toward the housing 10.

Please refer to FIG. 5 to FIG. 8, in another preferred embodiment of the present invention, the self-opening supporting device 3 further comprises a magnetic element 41 being disposed on the second moving element 35, and an attaching element 43 being disposed on the stand 37 corresponding to the magnetic element 41. The attaching element 43 and the magnetic element 41 magnetically contact with each other and the stand 37 may firmly attach to the housing 10 when the stand 37 retrieves to its original position.

In summary, when the self-opening supporting device of the present invention is placed on the working surface, the reaction force generated by the contact of the self-opening supporting device and the working surface is mechanically converted and is subsequently applied to expand the stand to a predetermined angle. The stand may further be swung out to a larger angle by the external force provided by the users. The stand may retrieve to its original position with the restoring force of the spring and/or the weight of the stand sequentially when the external force is unloaded. Comparing to the conventional supporting device, of which the stand of the supporting device needs to be operated by hand and even with both hands, the stand of the self-opening supporting device of the present invention is capable of automatically switching between the erect condition and the collapsed condition by simple operation. Also, the arrangement of the components in the self-opening supporting device of the present invention is less complicated and thus has lower cost.

Although the present invention has been explained in relation to its preferred embodiment, it is to be understood that many other possible modifications and variations can be made without departing from the spirit and scope of the invention as hereinafter claimed.

What is claimed is:

1. A self-opening supporting device with a housing of a display, comprising:
    the housing of the display having a height extending in a first direction;
    a securing element, being fastened within the housing of the display, wherein the securing element is formed with a first slide, which extends along an inclined direction with respect to the height of the housing of the display;
    a first moving element, having a first sliding block and being slidably disposed at the first slide, and a convex portion being formed with a first abutting surface and a second abutting surface which are adjacent to each other and positioned on top of the first moving element;
    a stand, being pivotally secured to the securing element at a first end; and
    an elastic element, being disposed between the stand and the securing element;
    wherein, when an external force is applied to the first moving element along the first direction, the first moving element slides along the first slide with the first sliding block and the first abutting surface rotates a second end of the stand to swing out to a first angle away from the housing of the display, and the second abutting surface subsequently rotates the second end of the stand to swing out to a second angle further away from the housing of the display to open the self-opening supporting device, and when the stand swings out to an angle exceeding the second angle, the elastic element is actuated; wherein the second angle is larger than the first angle.

2. The self-opening supporting device as claimed in claim 1, wherein the first slide comprises two first slots which are parallel to each other, and the first sliding block comprises two first sliding shafts, which are respectively disposed through the first slots.

3. The self-opening supporting device as claimed in claim 2, further comprising a second moving element having a second sliding block, the securing element is further formed with a second slide which substantially extends along the first direction for the second sliding block being slidably disposed therethrough, in which the second moving element is able to move along the first direction when the second sliding block slides along the second slide.

4. The self-opening supporting device as claimed in claim 3, wherein the second slide comprises two second slots, and the second sliding block comprises two second sliding shafts, which are respectively disposed through the second slots.

5. The self-opening supporting device as claimed in claim 3, wherein when the second moving element moves along a direction opposing the first direction, the second moving element contacts the first moving element and transfers the external force to the first moving element.

6. The self-opening supporting device as claimed in claim 3, further comprising a magnetic element being disposed on the second moving element, and an attaching element being disposed on the stand corresponding to the magnetic element to magnetically attract with each other so that the attaching element and the magnetic element magnetically contact with each other and the stand substantially attach to the housing when the external force is unloaded.

7. The self-opening supporting device as claimed in claim 1, wherein the stand is pivotally secured to the securing element by a pivot axle, the elastic element is a torsion spring which is sleeved to the pivot axle and has a free end, the free end abuts against the stand and the torsion spring is actuated when the stand swings out to the angle exceeding the predetermined angle.

8. The self-opening supporting device as claimed in claim 1, wherein when the external force is unloaded, the stand is retrieved to the predetermined angle by the elastic element, and subsequently toward the housing by its own weight.

9. The self-opening supporting device as claimed in claim 1, wherein the housing includes a front surface and a back surface opposing to the front surface, and the first abutting surface extends along the inclined direction which is simultaneously towards the front surface and away from the elastic element.

10. The self-opening supporting device as claimed in claim 9, wherein the securing element is fastened on the back surface, and the stand is driven by the first moving element to swing out from the back surface.

* * * * *